July 22, 1952

L. M. WALRATH 2,604,009

MAGNIFIER AND BOOKSTAND

Filed March 7, 1950

INVENTOR:

Luella M. Walrath,

BY Cushman, Darby & Cushman
ATTORNEYS.

July 22, 1952 L. M. WALRATH 2,604,009
MAGNIFIER AND BOOKSTAND
Filed March 7, 1950 2 SHEETS—SHEET 2
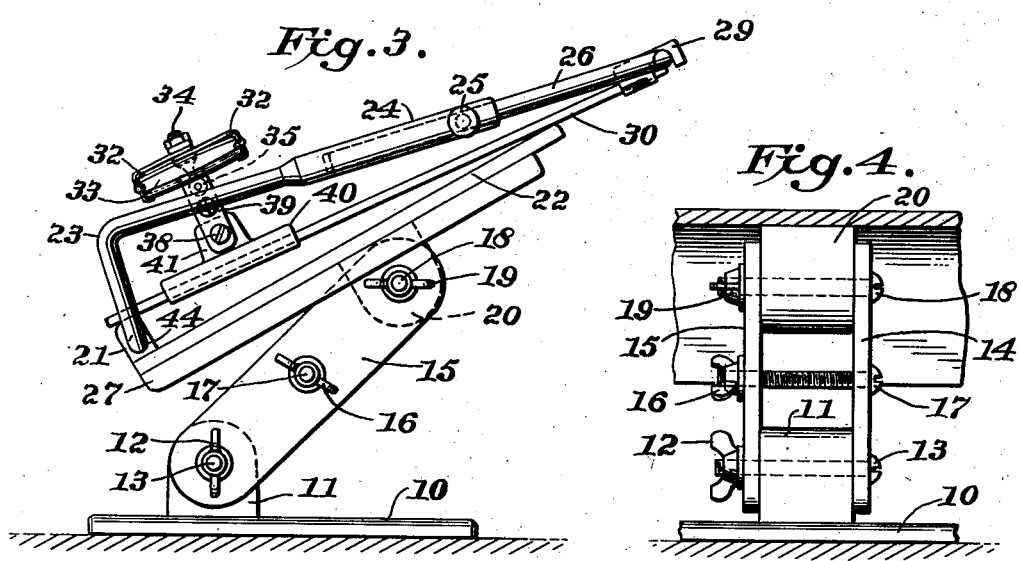
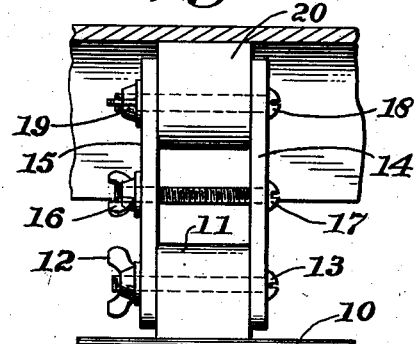
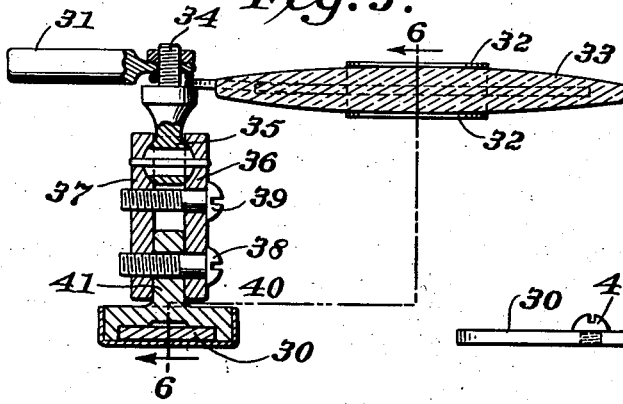
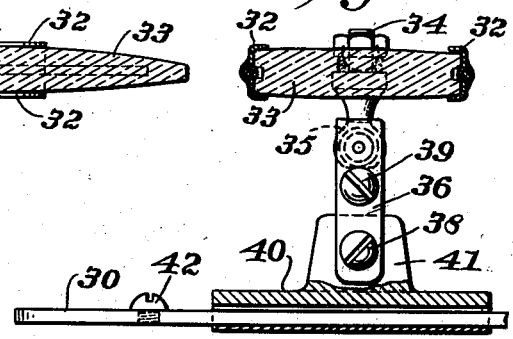
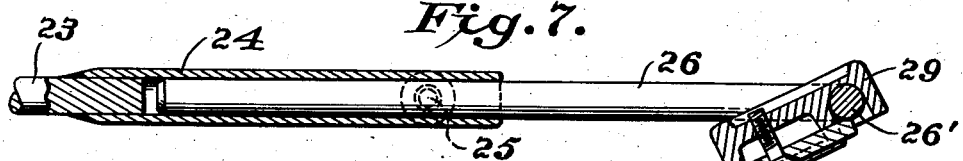
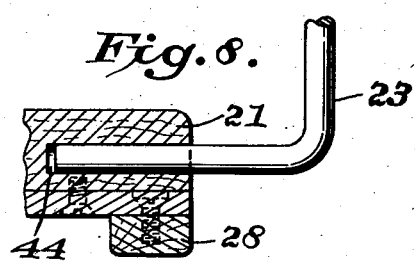
INVENTOR:
Luella M. Walrath,
BY Cushman, Darby & Cushman
ATTORNEYS.

Patented July 22, 1952

2,604,009

UNITED STATES PATENT OFFICE 2,604,009

MAGNIFIER AND BOOKSTAND

Luella M. Walrath, Houston, Tex.

Application March 7, 1950, Serial No. 148,045

3 Claims. (Cl. 88—39)

The present invention relates to a combination book support and magnifier utilizing a reading lens, and more particularly, to that type of device useful among typists, students and law libraries and the like for the reading of fine print, particularly in legal periodicals, abstracts of title and maps.

The object of the invention is to provide an improved means for holding an open book or other printed matter so that a magnifying reading lens may be moved over both pages of an open book or over the entire surface of other open printed matter, whereby the position of the reading lens may be varied easily and without loss of time.

Another object of the present invention is to provide a combination book support and magnifying lens so constructed that the position and focus of the reading lens can be adjusted with one hand if necessary.

A still further object of this invention is to provide a combination book support and magnifier having a carrier frame projected beyond the edges of the book support and so constructed that it may be easily raised and lowered or entirely removed from the book support for use on maps, charts, and the like.

A further object of the present invention is to provide a combination book support and lens holding frame so attached to a movable slide as to permit universal movement of the lens holding frame and the contained magnifying glass so that the magnifying lens may be accurately focused for each individual reader and also to permit a circular area of printed matter to be covered by a simple movement of the horizontally adjustable bar or its attached, vertically adjustable slide element.

Another object of the present invention is to provide in a combination book support and magnifier, means for moving a magnifying lens horizontally and vertically relative to a sheet of reading material independently of the means for universally positioning the lens holding frame, in a simple and expeditious manner.

A still further object of the present invention is to provide a combination book support and magnifier so constructed as to permit its being lowered sufficiently to rest on one's lap or raised to a height practical for table use.

Another object of this invention is to provide in a combination book support and magnifier a lens holding frame so constructed as to permit easy removal of the glass lens for cleaning or storage purposes.

Broadly speaking, the present invention contemplates a base pivotally connected to a book supporting table in a manner to permit the table being raised or lowered and to also permit the adjustment of the angle of inclination of the table. A carrier frame is removably mounted on the table in a manner so that it may be easily swung clear of the table surface. A bar is slidably secured to one side of the carrier, which bar carries a rider or member movable vertically along the bar, and pivotally secured to the rider or movable member is a clamp to frictionally secure a lens holding frame for universal adjustment. By means of this construction, the carrier frame including the slide bar and lens may be swung out of position and an open book placed on the inclined table after which the carrier frame is swung back into position over the open book and the lens positioned over the material to be read or copied by means of the slide bar and movable rider, the focus and fine adjustment of the lens being accomplished by means of the universal joint between the clamp and lens holding frame.

Other objects of this invention will be apparent from the following description and accompanying drawings.

Referring to the drawings in which is shown a preferred embodiment of this invention:

Figure 3 is a side elevational view in the same inclined relationship as in Figures 1 and 2;

Figure 4 is a fragmental rear view of the device;

Figure 5 is an enlarged detail section of the magnifier including frame and adjusting means;

Figure 6 is an enlarged detail section in the plane indicated by the line 6—6 of Figure 5;

Figure 7 is an enlarged detail section showing the extendable carrier frame; and Figure 8 is an enlarged detail section of the carrier frame pivot.

Figure 1:
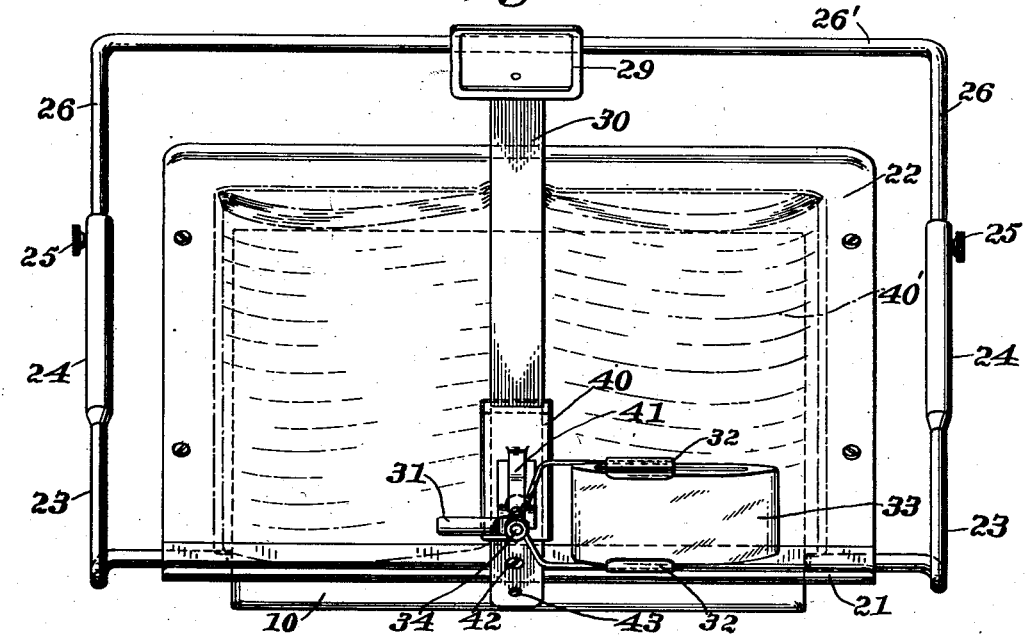
Figure 1 is a plan view of the combination book support and magnifier, adjusted with the book support in inclined relationship to the base.

Referring to the drawings, there is illustrated a base member 10 having an upwardly extending lug or block 11 having a hole drilled therethrough for the reception of the adjusting screw 13 which secures the arms 14 and 15 of the clamp member to the lug 11. A suitable wing nut 12 is provided so that clamping arms 14, 15 may be easily adjusted relative to the base.

A downwardly extending lug or block 20 secured to the underside of the table 22 receives the upper ends of clamping arms 14 and 15 as shown in Figures 3 and 4. Additional clamping screws 17 and 18 having wing nuts 16 and 19 associated therewith are provided to insure the proper positioning of the table 22.

A table 22 is provided to hold an open book or other printed periodical as at 40' (Fig. 1). The table 22 has the spaced reinforcing members 27 and 28 secured to the outer underside thereof by any suitable means. A raised portion 21 is provided on the lower edge of the table 22 to hold an open book and also to receive the inwardly extending side arms 23, 23 of the carrier frame 26' in the preferred embodiment. The raised portion 21 has bearing holes 44 in opposite sides thereof and which may be of the same diameter as the arms 23 so that the latter may be easily pivoted therein and which permits easy disengagement of the arms from the holes by springing the arms outwardly.

The carrier frame 26' may be of any suitable size and shape but is shown rectangular and formed in two pieces in order to permit the width of the frame to be varied to accommodate different sized books and printed matter. The lower half of the frame comprises the spaced arms 23—23 bent downwardly and inwardly at their lower ends to fit into the holes 44—44 of raised portion 21 while the upwardly extending end portions of the arms have the enlarged sockets 24—24 (Figures 3 and 7) to telescopically receive the downwardly extending arms 26—26 constituting the other half of the carrire frame 26'.

Figure 2:
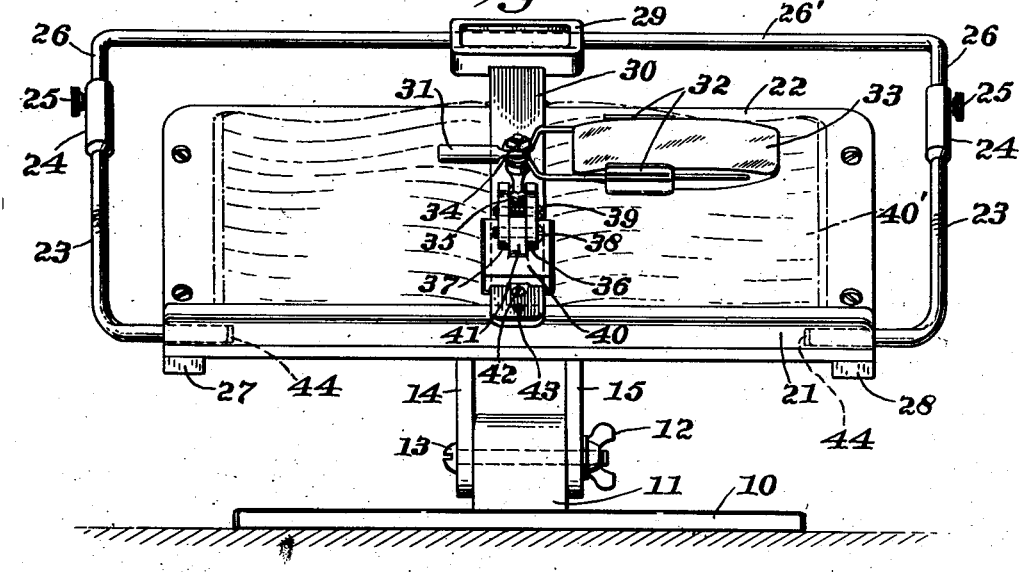
Figure 2 is a front view of the device shown in Figure 1.

Figure 1 shows arms 26—26 in extended position while Figure 2 shows the arms in retracted position. Suitable thumb screws 25—25 are provided to hold the arms 26—26 in the desired position.

Attached to the transverse horizontal portion of the carrier frame 26' is a conventional slide element 29 by means of which the bar 30 may be moved horizontally the length of the carrier frame. Bar 30 has the movable rider or member 40 associated therewith to carry a lens and holding frame to be subsequently described. The member 40 is movable vertically across the surface of the table 22 to give up and down coverage of the reading matter on the table being worked upon.

A suitable stop such as pin 42 (Fig. 6) on the bar 30 prevents the disengagement of member 40 from bar 30 when member 40 is at its lowermost position. The bar 30 can be formed with a threaded hole 43 (Fig. 1) spaced slightly below stop 42 so as to permit the position of the stop 42 to be changed if necessary to permit longer up and down travel of member 40.

A top lug 41 (Fig. 6) integral with the member 40 pivotally receives the clamping arms 36 and 37 as at 38 (Fig. 5). The tops of the clamping arms 36 and 37 have dished out portions or sockets on their inner faces to receive the ball element 35 so as to provide a universal joint (Fig. 5).

A lens holding frame comprising the two spring clamps 32 and the adjusting handle 31 is secured to the ball element 35 as at 34 (Fig. 5). As shown in Figures 1 and 2, a suitable magnifying lens 33 is held by the spring arms 32 in a manner which permits the easy removal of the lens from the frame.

Screw 39 is provided to maintain sufficient frictional contact between clamping arms 36, 37 and the ball element 35 so that the lens holding frame will not move from its adjusted position without the application of a small force to handle 31.

It will readily be observed that the magnifying lens may be focused and positioned easily and accurately over any area of an open book or the like by simply raising bar 30 from its rest on raised portion 21 and moving slide 29 to the right or left on the carrier 26' after which the movable rider 40 may be moved up or down on bar 30, member 40 being positioned on bar 30 by frictional contact therewith. Clamping arms 26 and 37 may be pivoted to aid in proper focusing of the lens 33 after which the final position of the lens may be had by moving handle 31 associated with the ball member 35. By means of the universal joint provided by ball element 35 it will be observed that the lens 33 may be raised, lowered or moved in a circular path so as to cover a large segment of a printed page without movement of the rider or bar member.

The invention has been described herein in detail, yet it is to be understood that the invention is not to be limited thereby, as changes may be made in the arrangement and proportion of parts, and equivalents may be substituted without departing from the spirit and scope of the following claims.

I claim:

1. A portable reading table and magnifier comprising a base member, an upstanding lug on said base member, a pair of parallel clamping arms pivotally mounted to said lug by means of a bolt and wing nut whereby said arms may be fixed relative to said lug, a table member for holding reading material, a lug on the undersurface of said table substantially medially thereof with the free ends of said clamping arms being pivotally mounted thereon whereby said table may be folded flat against said base member, a locking nut to secure said arms against pivotal movement relative to said table, a third locking nut associated with said clamping arms intermediate of said other two, whereby pivotal movement of said clamping arms relative to said base member and said table is prevented, a rectangular carrier frame pivotally secured to the lower end of said table, an elongated bar member slidably attached to the upper transverse portion of said frame and extending across said table, a slide member mounted for vertical movement on said bar, an upstanding lug on said slide, a second pair of clamping arms on said lug, means for pivotally securing said arms to said lug, a lens holding frame secured by the free ends of said clamping arms, and a magnifying glass carried by said lens holding frame, the parts being so constructed and arranged as to permit both pages of an open book to be covered without moving said book.

2. A device as claimed in claim 1 wherein the side arms of said carrier frame are constructed of two telescoping sections with means for locking said sections together.

3. A device as claimed in claim 1 wherein the inner faces of the free ends of said second pair of clamping arms are dished to receive a ball member integral with said lens holding frame and constituting a universal joint for said frame whereby the position, and focus of the reading lens can be quickly and conveniently varied.

LUELLA M. WALRATH.

REFERENCES CITED

The following references are of record in the file of this patent:

UNITED STATES PATENTS

| Number | Name | Date |
|---|---|---|
| 369,114 | Knapp | Aug. 30, 1887 |
| 1,376,212 | Mayhew | Apr. 26, 1921 |
| 1,733,107 | Ahlberg | Oct. 29, 1929 |
| 2,469,129 | Reimann | May 3, 1949 |
| 2,503,550 | Good | Apr. 11, 1950 |

FOREIGN PATENTS

| Number | Country | Date |
|---|---|---|
| 2,330 | Great Britain | of 1914 |
| 118,438 | Great Britain | Aug. 27, 1918 |
| 83,329 | Switzerland | Dec. 1, 1919 |